United States Patent [19]

Im

[11] Patent Number: 6,048,568
[45] Date of Patent: Apr. 11, 2000

[54] METHOD FOR PREPARING A BEAN CURD CONTAINING PINE LEAVES

[76] Inventor: Seong Hwan Im, 523 Yangieong-dong, Buk-ku, Ulsan-shi, Rep. of Korea

[21] Appl. No.: 09/074,825

[22] Filed: May 8, 1998

[30] Foreign Application Priority Data

Apr. 9, 1998 [KR] Rep. of Korea ............... 98 12588

[51] Int. Cl.⁷ ........................................ A23L 1/20
[52] U.S. Cl. ..................... 426/634; 426/472; 426/520; 426/615; 426/629
[58] Field of Search ..................... 426/634, 615, 426/520, 472, 629

[56] References Cited

U.S. PATENT DOCUMENTS

| | | | |
|---|---|---|---|
| 4,140,811 | 2/1979 | Ogasa et al. | 426/634 |
| 4,664,930 | 5/1987 | Moriya | 426/573 |
| 4,897,280 | 1/1990 | Ohtsu | 426/656 |
| 4,965,080 | 10/1990 | Akasaka et al. | 426/104 |
| 4,983,414 | 1/1991 | Sengoku et al. | 426/634 |
| 4,992,294 | 2/1991 | Noguchi | 426/634 |
| 5,087,465 | 2/1992 | Chen | 426/241 |
| 5,094,875 | 3/1992 | Chen | 426/634 |
| 5,190,787 | 3/1993 | Takeoka et al. | 426/634 |
| 5,445,839 | 8/1995 | Hagiwara et al. | 426/270 |

*Primary Examiner*—Milton Cano
*Assistant Examiner*—Hao Mai
*Attorney, Agent, or Firm*—John L. Chiatalas

[57] ABSTRACT

The present invention relates to a method of preparing a bean curd containing pine leaves including the steps of: admixing beans kept soaked in water with pine leaves at the ratio of 15 to 20:1; smashing the mixture into powder of 50 to 80 mesh; boiling the powder of the mixture in the temperature range of 95 to 100; separating it into soft bean-curd juice and lees; and providing coagulation of the soft bean-curd juice, so that the bean curd gives out a unique fragrance of the pine leaves and the man who eats the bean curd can intake all kinds of nutrients such as amino acids, minerals and vitamins contained in the pine leaves.

1 Claim, No Drawings

METHOD FOR PREPARING A BEAN CURD CONTAINING PINE LEAVES

BACKGROUND OF THE INVENTION

1. Field of the Invention

The present invention relates to a method for preparing a bean curd and, more particularly, to a method for preparing a bean curd containing pine leaves wherein powder of pine leaves is incorporated into the bean curd such that the bean curd gives out the nice fragrance of the pine leaves and man who eats the bean curd can intake all kinds of nutrients contained in the bean curd such as amino acids, minerals, vitamins and so forth.

2. Description of the Related Art

Bean curd is one of the traditional foods made of unmixed beans that has been handed down from generations and is very nutritious with proteins extracted out of bean components. Such a bean curd has been enjoyed regardless of sex and age up to today because it leaves a clean aftertaste with a high value of nutrition and contains no cholesterol as a healthful food which is preventive of arteriosclerosis and other geriatric diseases such as hypertension, cardiac disorder, diabetes and the like.

In the preparation of a bean curd, beans kept soaked in water are smashed with water, boiled in a pot or kettle and filtered with a filter net or filter bed to separate into bean-curd juice and lees. An addition of salt water to the bean-curd juice causes coagulation of the bean-curd juice into a bean curd.

Pine leaves have been known as one of the medical stuffs and foods as well as relief famine plants, and especially have been used as a spice in all sorts of foods.

A recent biochemical analysis for the pine leaves shows that pine leaves are composed of various nutrients (per 100 grams of pine leaves) as listed in the following table for the food compositions prepared by the rural nutrition improvement workshop of the Korean Rural Development Office.

TABLE

| | |
|---|---|
| Energy (kcal) | 132 |
| Water (%) | 58.1 |
| Protein (g) | 4.5 |
| Fat (g) | 3.9 |
| Carbohydrate (saccharide) (g) | 19.6 |
| Carbohydrate (fibroid material) (g) | 13.3 |
| Lime (g) | 0.6 |
| Calcium (mg) | 61 |
| Phosphor (mg) | 51 |
| Iron (mg) | 3.7 |
| Vitamin A (I.U) | 5.165 |
| Thiamin (mg) | 0.7 |
| Riboflavin (mg) | 0.16 |
| Niacin (mg) | 0.2 |
| Ascorbic acid (mg) | 29 |

In addition to the above nutrients as listed in the table, the pine leaves are also well-known to contain other minerals and medical components such as a component for dissolving calcium which is effective in the treatment of arteriosclerosis, glycokinin which is effective for diabetes, abietic acid detoxicating opium or nicotine, and terpene which lowers the level of cholesterol in blood and highly effects as a vasodilator and a hormone secretion stimulator.

As described above, bean curds and pine leaves contain nutrients and medical components which are beneficial to health, and accordingly, can be used as healthful foods.

However, bean curds and pine leaves take only nutritious components of their own and thus involve a problem in that we have to separately intake the other components which do not exist in each other. In particular, although pine leaves emit a good smell and contain efficient nutritious and medical components, we have not developed a technique for taking them with good taste and maximizing their nutritious and medical effects upon our bodies as beneficial foods to health such that we cannot make efficient use for foods of pine trees which are most widely spread in the whole land in Korea.

SUMMARY OF THE INVENTION

Therefore, an objective of the present invention is to provide a method for preparing a bean curd containing pine leaves wherein powder of pine leaves is incorporated into the bean curd such that the bean curd gives out the nice fragrance of the pine leaves without having a bad effect upon the taste of the bean curd and a person who eats the bean curd can intake all sorts of nutritious and medical components contained in the pine leaves and the nutrients of the bean curd.

In accordance with the present invention, a method for preparing a bean curd containing pine leaves, comprising the steps of: admixing beans kept soaked in water with pine leaves; smashing the mixture into powder; boiling the powder of the mixture in the temperature range of 95 to 100° C.; separating it into soft bean-curd juice and lees; and providing coagulation of the soft bean-curd juice, wherein the ratio of the beans and the pine leaves in the mixture is about 15 to 20:1.

DETAILED DESCRIPTION OF THE PREFERRED EMBODIMENT

Hereinafter, the present invention will be described by way of illustrative examples in detail.

Beans for preparing a bean curd are kept steeped in water for about 24 hours.

The beans soaked in water and washed pine leaves are admixed in the ratio of 15 to 20:1 in volume.

The pine leaves may be added or decreased in amount in the mixture according to the local and individual preference without specifically limited to the above proportion in the present invention. An increase in the proportion of the pine leaves enhances a good pine fragrance but decreases the sense of taste, while a decrease in the proportion of the pine leaves maintains the taste with deterioration of the pine fragrance. Therefore, the ratio of the beans and the pine leaves is in the range of 15 to 20:1 in volume.

Thus admixed beans and pine leaves are smashed in a grinder into powder of approximately 50 to 80 mesh in the same manner as the conventional process.

The smashed beans and pine leaves are boiled in a kettle with water in the temperature range of 95 to 100° C.

The boiled powder of beans and pine leaves is filtered in a filter bed so that it is separated into bean-curd juice and lees by a centrifugal separation and/or a compression.

The soft bean-curd juice separated is placed in a hardening bath and coagulated with a coagulating agent consisting of salt water. The coagulating agent may contain magnesium chloride ($MgCl_2$)

The hardened bean curd is shaped in a mold to obtain a final and weakly greenish bean curd which contains pine leaves of about 7 to 5 percent.

Accordingly, we can take this bean curd with a unique fragrance of pine tree in addition to the nutrients of pine leaves beneficial to health.

Especially, the rough and unpleasant aftertaste of the bean curd may be eliminated with a unique fragrance of the pine leaves.

Such as in the method of the present invention as described above, the bean curd containing pine leaves is very nutritious and gives out a pleasant, unique fragrance of the pine leaves which stimulates the appetite without taste deterioration, so that we can intake the nutrients contained in the beans and pine leaves beneficial to our health.

What is claimed is:

1. A method of preparing a bean curd containing pine leaves, comprising the steps of:

admixing from about 15 to 20 parts beans kept soaked in water with about 1 part pine leaves; smashing the mixture into powder; boiling the powder of the mixture in the temperature range of 95 to 100° C.; separating it into soft bean-curd juice and lees; and providing coagulation of the soft bean-curd juice.

* * * * *